United States Patent
Chishty et al.

(10) Patent No.: US 11,954,523 B2
(45) Date of Patent: Apr. 9, 2024

(54) TECHNIQUES FOR BEHAVIORAL PAIRING IN A TASK ASSIGNMENT SYSTEM WITH AN EXTERNAL PAIRING SYSTEM

(71) Applicant: Afiniti, Ltd., Hamilton (BM)

(72) Inventors: Ain Chishty, Rockville, MD (US); Hassan Afzal, Bethesda, MD (US)

(73) Assignee: AFINITI, LTD., Hamilton (BM)

( * ) Notice: Subject to any disclaimer, the term of this patent is extended or adjusted under 35 U.S.C. 154(b) by 577 days.

(21) Appl. No.: 17/162,322

(22) Filed: Jan. 29, 2021

(65) Prior Publication Data

US 2021/0240530 A1 Aug. 5, 2021

Related U.S. Application Data

(60) Provisional application No. 62/970,526, filed on Feb. 5, 2020.

(51) Int. Cl.
- *G06F 9/48* (2006.01)
- *G06F 5/06* (2006.01)
- *G06F 9/54* (2006.01)

(52) U.S. Cl.
CPC ............. *G06F 9/4881* (2013.01); *G06F 5/06* (2013.01); *G06F 9/547* (2013.01)

(58) Field of Classification Search
None
See application file for complete search history.

(56) References Cited

U.S. PATENT DOCUMENTS

| | | | |
|---|---|---|---|
| 5,155,763 A | 10/1992 | Bigus et al. | |
| 5,206,903 A | 4/1993 | Kohler et al. | |
| 5,327,490 A | 7/1994 | Cave | |
| 5,537,470 A | 7/1996 | Lee | |
| 5,702,253 A | 12/1997 | Bryce et al. | |
| 5,825,869 A | 10/1998 | Brooks et al. | |
| 5,903,641 A | 5/1999 | Tonisson | |
| 5,907,601 A | 5/1999 | David et al. | |

(Continued)

FOREIGN PATENT DOCUMENTS

| | | |
|---|---|---|
| AU | 2008349500 C1 | 5/2014 |
| AU | 2009209317 B2 | 5/2014 |

(Continued)

OTHER PUBLICATIONS

Afiniti, "Afiniti® Enterprise Behavioral Pairing™ Improves Contact Center Performance," White Paper, retrieved online from URL: <http://www.afinitit, com/wp-content/uploads/2016/04/Afiniti_White-Paper_Web-Email.pdf> 2016, (11 pages).

(Continued)

*Primary Examiner* — Van H Nguyen

(74) *Attorney, Agent, or Firm* — Rothwell, Figg, Ernst & Manbeck, P.C.

(57) ABSTRACT

There are provided a method for behavioral pairing in a task assignment system with an external pairing system. The method includes transmitting, to the external pairing system over an application programming interface, a control flag and a benchmark flag and receiving, from the external pairing system, a task-agent pairing based on one of a first pairing strategy and a second pairing strategy. The task-agent pairing is based at least in part on the control flag and the benchmark flag.

24 Claims, 5 Drawing Sheets

(56) References Cited

U.S. PATENT DOCUMENTS

| | | |
|---|---|---|
| 5,926,538 A | 7/1999 | Deryugin et al. |
| 6,021,428 A | 2/2000 | Miloslavsky |
| 6,044,355 A | 3/2000 | Crockett et al. |
| 6,044,468 A | 3/2000 | Osmond |
| 6,049,603 A | 4/2000 | Schwartz et al. |
| 6,052,460 A | 4/2000 | Fisher et al. |
| 6,064,731 A | 5/2000 | Flockhart et al. |
| 6,088,444 A | 7/2000 | Walker et al. |
| 6,163,607 A | 12/2000 | Bogart et al. |
| 6,222,919 B1 | 4/2001 | Hollatz et al. |
| 6,292,555 B1 | 9/2001 | Okamoto |
| 6,324,282 B1 | 11/2001 | McIllwaine et al. |
| 6,333,979 B1 | 12/2001 | Bondi et al. |
| 6,389,132 B1 | 5/2002 | Price |
| 6,389,400 B1 | 5/2002 | Bushey et al. |
| 6,408,066 B1 | 6/2002 | Andruska et al. |
| 6,411,687 B1 | 6/2002 | Bohacek et al. |
| 6,424,709 B1 | 7/2002 | Doyle et al. |
| 6,434,230 B1 | 8/2002 | Gabriel |
| 6,496,580 B1 | 12/2002 | Chack |
| 6,504,920 B1 | 1/2003 | Okon et al. |
| 6,519,335 B1 | 2/2003 | Bushnell |
| 6,519,568 B1 | 2/2003 | Harvey et al. |
| 6,535,600 B1 | 3/2003 | Fisher et al. |
| 6,535,601 B1 | 3/2003 | Flockhart et al. |
| 6,570,980 B1 | 5/2003 | Baruch |
| 6,587,556 B1 | 7/2003 | Judkins et al. |
| 6,603,854 B1 | 8/2003 | Judkins et al. |
| 6,639,976 B1 | 10/2003 | Shellum et al. |
| 6,661,889 B1 | 12/2003 | Flockhart et al. |
| 6,704,410 B1 | 3/2004 | McFarlane et al. |
| 6,707,904 B1 | 3/2004 | Judkins et al. |
| 6,714,643 B1 * | 3/2004 | Gargeya ............ H04M 3/523 379/266.03 |
| 6,744,878 B1 | 6/2004 | Komissarchik et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,895,083 B1 | 5/2005 | Bers et al. |
| 6,922,466 B1 | 7/2005 | Peterson et al. |
| 6,937,715 B2 | 8/2005 | Delaney |
| 6,956,941 B1 | 10/2005 | Duncan et al. |
| 6,970,821 B1 | 11/2005 | Shambaugh et al. |
| 6,978,006 B1 * | 12/2005 | Polcyn ............ G06Q 10/0631 379/265.06 |
| 7,023,979 B1 | 4/2006 | Wu et al. |
| 7,039,166 B1 | 5/2006 | Peterson et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,068,775 B1 | 6/2006 | Lee |
| 7,092,509 B1 | 8/2006 | Mears et al. |
| 7,103,172 B2 | 9/2006 | Brown et al. |
| 7,158,628 B2 * | 1/2007 | McConnell ......... H04M 3/5232 379/265.06 |
| 7,184,540 B2 | 2/2007 | Dezonno et al. |
| 7,209,549 B2 | 4/2007 | Reynolds et al. |
| 7,231,032 B2 | 6/2007 | Nevman et al. |
| 7,231,034 B1 | 6/2007 | Rikhy et al. |
| 7,236,584 B2 | 6/2007 | Torba |
| 7,245,716 B2 | 7/2007 | Brown et al. |
| 7,245,719 B2 | 7/2007 | Kawada et al. |
| 7,266,251 B2 | 9/2007 | Rowe |
| 7,269,253 B1 | 9/2007 | Wu et al. |
| 7,353,388 B1 | 4/2008 | Gilman et al. |
| 7,372,952 B1 | 5/2008 | Wu et al. |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykin |
| 7,734,032 B1 | 6/2010 | Kiefhaber et al. |
| 7,798,876 B2 | 9/2010 | Mix |
| 7,826,597 B2 | 11/2010 | Berner et al. |
| 7,864,944 B2 | 1/2011 | Khouri et al. |
| 7,899,177 B1 | 3/2011 | Bruening et al. |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,000,989 B1 | 8/2011 | Kiefhaber et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,175,253 B2 | 5/2012 | Knott et al. |
| 8,229,102 B2 | 7/2012 | Knott et al. |
| 8,249,245 B2 | 8/2012 | Jay et al. |
| 8,259,924 B2 * | 9/2012 | Korolev ............ H04M 3/5141 379/266.02 |
| 8,295,471 B2 | 10/2012 | Spottiswoode et al. |
| 8,300,798 B1 | 10/2012 | Wu et al. |
| 8,306,212 B2 | 11/2012 | Arora |
| 8,359,219 B2 | 1/2013 | Chishti et al. |
| 8,433,597 B2 | 4/2013 | Chishti et al. |
| 8,472,611 B2 | 6/2013 | Chishti |
| 8,565,410 B2 | 10/2013 | Chishti et al. |
| 8,634,542 B2 | 1/2014 | Spottiswoode et al. |
| 8,644,490 B2 | 2/2014 | Stewart |
| 8,670,548 B2 | 3/2014 | Xie et al. |
| 8,699,694 B2 | 4/2014 | Chishti et al. |
| 8,712,821 B2 | 4/2014 | Spottiswoode |
| 8,718,271 B2 | 5/2014 | Spottiswoode |
| 8,724,797 B2 | 5/2014 | Chishti et al. |
| 8,731,178 B2 | 5/2014 | Chishti et al. |
| 8,737,595 B2 | 5/2014 | Chishti et al. |
| 8,750,488 B2 | 6/2014 | Spottiswoode et al. |
| 8,761,380 B2 | 6/2014 | Kohler et al. |
| 8,781,100 B2 | 7/2014 | Spottiswoode et al. |
| 8,781,106 B2 | 7/2014 | Afzal |
| 8,792,630 B2 | 7/2014 | Chishti et al. |
| 8,824,658 B2 | 9/2014 | Chishti |
| 8,831,207 B1 | 9/2014 | Agarwal |
| 8,856,869 B1 | 10/2014 | Brinskelle |
| 8,879,715 B2 | 11/2014 | Spottiswoode et al. |
| 8,903,079 B2 | 12/2014 | Xie et al. |
| 8,913,736 B2 | 12/2014 | Kohler et al. |
| 8,929,537 B2 | 1/2015 | Chishti et al. |
| 8,938,063 B1 | 1/2015 | Hackbarth et al. |
| 8,995,647 B2 | 3/2015 | Li et al. |
| 9,020,137 B2 | 4/2015 | Chishti et al. |
| 9,025,757 B2 | 5/2015 | Spottiswoode et al. |
| 9,137,372 B2 * | 9/2015 | Conway ............ H04M 3/5175 |
| 9,215,323 B2 | 12/2015 | Chishti |
| 9,277,055 B2 | 3/2016 | Spottiswoode et al. |
| 9,300,802 B1 * | 3/2016 | Chishti ............ H04M 3/5183 |
| 9,426,296 B2 | 8/2016 | Chishti et al. |
| 9,692,899 B1 * | 6/2017 | Rizvi ............ G06Q 10/06398 |
| 9,712,676 B1 * | 7/2017 | Chishti ............ H04M 3/5183 |
| 9,712,679 B2 | 7/2017 | Chishti et al. |
| 9,781,269 B2 | 10/2017 | Chishti et al. |
| 9,787,841 B2 | 10/2017 | Chishti et al. |
| 9,930,180 B1 | 3/2018 | Kan et al. |
| 9,942,405 B1 | 4/2018 | Kan et al. |
| 9,955,013 B1 * | 4/2018 | Chishti ............ H04M 3/5232 |
| RE46,986 E | 8/2018 | Chishti et al. |
| 10,116,800 B1 | 10/2018 | Kan et al. |
| 10,135,987 B1 | 11/2018 | Chishti et al. |
| RE47,201 E | 1/2019 | Chishti et al. |
| 10,257,354 B2 * | 4/2019 | Chishti ............ G06F 16/9535 |
| 10,284,727 B2 | 5/2019 | Kan et al. |
| 10,320,984 B2 * | 6/2019 | Chishti ............ H04M 3/5238 |
| 10,326,882 B2 * | 6/2019 | Chishti ............ H04M 3/5175 |
| 10,404,861 B2 | 9/2019 | Kan et al. |
| 2001/0032120 A1 | 10/2001 | Stuart et al. |
| 2001/0044896 A1 | 11/2001 | Schwartz et al. |
| 2002/0018554 A1 | 2/2002 | Jensen et al. |
| 2002/0046030 A1 | 4/2002 | Haritsa et al. |
| 2002/0059164 A1 | 5/2002 | Shtivelman |
| 2002/0082736 A1 | 6/2002 | Lech et al. |
| 2002/0110234 A1 | 8/2002 | Walker et al. |

(56) References Cited

U.S. PATENT DOCUMENTS

| | | |
|---|---|---|
| 2002/0111172 A1 | 8/2002 | DeWolf et al. |
| 2002/0131399 A1 | 9/2002 | Philonenko |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |
| 2002/0184069 A1 | 12/2002 | Kosiba et al. |
| 2002/0196845 A1 | 12/2002 | Richards et al. |
| 2003/0002653 A1 | 1/2003 | Uckun |
| 2003/0059029 A1 | 3/2003 | Mengshoel et al. |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0028211 A1 | 2/2004 | Culp et al. |
| 2004/0057416 A1 | 3/2004 | McCormack |
| 2004/0096050 A1 | 5/2004 | Das et al. |
| 2004/0098274 A1 | 5/2004 | Dezonno et al. |
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0116240 A1 | 5/2007 | Foley et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0153996 A1 | 7/2007 | Hansen |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0211881 A1 | 9/2007 | Parker-Stephen |
| 2007/0219816 A1 | 9/2007 | Van Luchene et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0118052 A1 | 5/2008 | Houmaidi et al. |
| 2008/0144803 A1 | 6/2008 | Jaiswal et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0205611 A1 | 8/2008 | Jordan et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0249083 A1 | 10/2009 | Forlenza et al. |
| 2009/0304172 A1 | 12/2009 | Becerra et al. |
| 2009/0305172 A1 | 12/2009 | Tanaka et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142689 A1 | 6/2010 | Hansen et al. |
| 2010/0142698 A1 | 6/2010 | Spottiswoode et al. |
| 2010/0158238 A1 | 6/2010 | Saushkin |
| 2010/0183138 A1 | 7/2010 | Spottiswoode et al. |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2011/0206199 A1 | 8/2011 | Arora |
| 2012/0051536 A1 | 3/2012 | Chishti et al. |
| 2012/0051537 A1 | 3/2012 | Chishti et al. |
| 2012/0183131 A1 | 7/2012 | Kohler et al. |
| 2012/0224680 A1 | 9/2012 | Spottiswoode et al. |
| 2012/0278136 A1 | 11/2012 | Flockhart et al. |
| 2013/0003959 A1 | 1/2013 | Nishikawa et al. |
| 2013/0051545 A1 | 2/2013 | Ross et al. |
| 2013/0251137 A1 | 9/2013 | Chishti et al. |
| 2013/0287202 A1 | 10/2013 | Flockhart et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0119533 A1 | 5/2014 | Spottiswoode et al. |
| 2014/0270133 A1 | 9/2014 | Conway et al. |
| 2014/0341370 A1 | 11/2014 | Li et al. |
| 2015/0055772 A1 | 2/2015 | Klemm et al. |
| 2015/0281448 A1 | 10/2015 | Putra et al. |
| 2016/0080573 A1 | 3/2016 | Chishti |
| 2017/0013131 A1 | 1/2017 | Craib |
| 2017/0064080 A1 | 3/2017 | Chishti et al. |
| 2017/0064081 A1 | 3/2017 | Chishti et al. |
| 2017/0316438 A1 | 11/2017 | Konig et al. |
| 2018/0316793 A1 | 11/2018 | Kan et al. |
| 2018/0316794 A1 | 11/2018 | Kan et al. |
| 2019/0222697 A1 | 7/2019 | Kan et al. |

FOREIGN PATENT DOCUMENTS

| | | |
|---|---|---|
| AU | 2009311534 B2 | 8/2014 |
| AU | 2015203175 A1 | 7/2015 |
| AU | 2015243001 A1 | 11/2015 |
| CN | 101093590 A | 12/2007 |
| CN | 102164073 A | 8/2011 |
| CN | 102390184 A | 3/2012 |
| CN | 102555536 A | 7/2012 |
| CN | 202965525 U | 6/2013 |
| CN | 203311505 U | 11/2013 |
| CN | 102301688 B | 5/2014 |
| CN | 102017591 B | 11/2014 |
| EP | 0493292 A2 | 7/1992 |
| EP | 0863651 A2 | 9/1998 |
| EP | 0949793 A1 | 10/1999 |
| EP | 1011974 A1 | 6/2000 |
| EP | 1032188 A1 | 8/2000 |
| EP | 1107557 A2 | 6/2001 |
| EP | 1335572 A2 | 8/2003 |
| EP | 2338270 B1 | 4/2018 |
| GB | 2339643 A | 2/2000 |

(56) References Cited

FOREIGN PATENT DOCUMENTS

| | | |
|---|---|---|
| JP | 11-098252 A | 4/1999 |
| JP | 2000-069168 A | 3/2000 |
| JP | 2000-078291 A | 3/2000 |
| JP | 2000-078292 A | 3/2000 |
| JP | 2000-092213 A | 3/2000 |
| JP | 2000-507420 A | 6/2000 |
| JP | 2000-236393 A | 8/2000 |
| JP | 2000-253154 A | 9/2000 |
| JP | 2001-292236 A | 10/2001 |
| JP | 2001-518753 A | 10/2001 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 2009-081627 A | 4/2009 |
| JP | 2011-511533 A | 4/2011 |
| JP | 2011-511536 A | 4/2011 |
| JP | 2012-075146 A | 4/2012 |
| JP | 5421928 B2 | 2/2014 |
| JP | 5631326 B2 | 11/2014 |
| JP | 5649575 B2 | 1/2015 |
| JP | 2015-514268 A | 5/2015 |
| JP | 2015-514371 A | 5/2015 |
| KR | 10-2002-0044077 A | 6/2002 |
| KR | 10-2013-0099554 A | 9/2013 |
| MX | 316118 | 12/2013 |
| MX | 322251 | 7/2014 |
| NZ | 587100 B | 10/2013 |
| NZ | 587101 B | 10/2013 |
| NZ | 591486 B | 1/2014 |
| NZ | 592781 B | 3/2014 |
| PH | 1-2010-501704 | 2/2014 |
| PH | 1-2010-501705 | 2/2015 |
| PH | 1-2011-500868 | 6/2015 |
| WO | WO-1999/17517 A1 | 4/1999 |
| WO | WO-00/70849 A2 | 11/2000 |
| WO | WO-2001/063894 A2 | 8/2001 |
| WO | WO-2006/124113 A2 | 11/2006 |
| WO | WO-2009/097018 A1 | 8/2009 |
| WO | WO-2009/097210 A1 | 8/2009 |
| WO | WO-2010/053701 A2 | 5/2010 |
| WO | WO-2011/081514 A1 | 7/2011 |
| WO | WO-2013/148453 A1 | 10/2013 |
| WO | WO-2015/019806 A1 | 2/2015 |
| WO | WO-2016/048290 A1 | 3/2016 |

OTHER PUBLICATIONS

Anonymous, (2006) "Performance Based Routing in Profit Call Centers," The Decision Makers' Direct, located at www.decisioncraft.com, Issue Jun. 2002, (3 pages).

Chen, G., et al., "Enhanced Locality Sensitive Clustering in High Dimensional Space", Transactions on Electrical and Electronic Materials, vol. 15, No. 3, Jun. 25, 2014, pp. 125-129 (5 pages).

Cleveland, William S., "Robust Locally Weighted Regression and Smoothing Scatterplots," Journal of the American Statistical Association, vol. 74, No. 368, pp. 829-836 (Dec. 1979).

Cormen, T.H., et al., "Introduction to Algorithms", Third Edition, Chapter 26 and 29, 2009, (116 pages).

Gans, N. et al., "Telephone Call Centers: Tutorial, Review and Research Prospects," Manufacturing & Service Operations Management, vol. 5, No. 2, 2003, pp. 79-141, (84 pages).

International Preliminary Report on Patentability and Written Opinion issued in connection with PCT/US2009/066254 dated Jun. 14, 2011, (6 pages).

International Search Report and Written Opinion issued by the European Patent Office as International Searching Authority for PCT/IB2016/001762 dated Feb. 20, 2017, (15 pages).

International Search Report and Written Opinion issued by the European Patent Office as International Searching Authority for PCT/IB2016/001776 dated Mar. 3, 2017, (16 pages).

International Search Report and Written Opinion issued by the European Patent Office as International Searching Authority for PCT/IB2017/000570 dated Jun. 30, 2017, (13 pages).

International Search Report and Written Opinion issued by the European Patent Office as International Searching Authority for PCT/IB2018/000434 dated Jun. 20, 2018, (14 pages).

International Search Report and Written Opinion issued in connection with PCT/IB2018/000886 dated Dec. 4, 2018, (13 pages).

International Search Report and Written Opinion issued in connection with PCT/IB2018/000907 dated Nov. 26, 2018, (11 pages).

International Search Report issued in connection with PCT/US2009/054352 dated Mar. 12, 2010, (5 pages).

International Search Report issued in connection with PCT/US2008/077042 dated Mar. 13, 2009, (3 pages).

International Search Report issued in connection with PCT/US2009/031611 dated Jun. 3, 2009, (5 pages).

International Search Report issued in connection with PCT/US2009/061537 dated Jun. 7, 2010, (5 pages).

International Search Report issued in connection with PCT/US2009/066254 dated Feb. 24, 2010, (4 pages).

International Search Report issued in connection with PCT/US2013/033261 dated Jun. 14, 2013, (3 pages).

International Search Report issued in connection with PCT/US2013/033265 dated Jul. 9, 2013, (2 pages).

International Search Report issued in connection with PCT/US2013/033268 dated May 31, 2013, (2 pages).

Ioannis Ntzoufras "Bayesian Modeling Using Winbugs An Introduction", Department of Statistics, Athens University of Economics and Business, Wiley-Interscience, A John Wiley & Sons, Inc., Publication, Chapter 5, Jan. 1, 2007, pp. 155-220 (67 pages).

Koole, G. et al., "An Overview of Routing and Staffing Algorithms in Multi-Skill Customer Contact Centers," Manuscript, Mar. 6, 2006, (42 pages).

Koole, G., "Performance Analysis and Optimization in Customer Contact Centers," Proceedings of the Quantitative Evaluation of Systems, First International Conference, Sep. 27-30, 2004, (4 pages).

Nocedal, J. and Wright, S. J., "Numerical Optimization," Chapter 16 Quadratic Programming, 2006, pp. 448-496 (50 pages).

Ntzoufras, "Bayesian Modeling Using Winbugs". Wiley Interscience, Chapter 5, Normal Regression Models, Oct. 18, 2007, Redacted version, pp. 155-220 (67 pages).

Press, W. H. and Rybicki, G. B., "Fast Algorithm for Spectral Analysis of Unevenly Sampled Data," The Astrophysical Journal, vol. 338, Mar. 1, 1989, pp. 277-280 (4 pages).

Riedmiller, M. et al., "A Direct Adaptive Method for Faster Backpropagation Learning: The RPROP Algorithm," 1993 IEEE International Conference on Neural Networks, San Francisco, CA, Mar. 28-Apr. 1, 1993, 1:586-591 (8 pages).

Stanley et al., "Improving Call Center Operations Using Performance-Based Routing Strategies," California Journal of Operations Management, 6(1), 24-32, Feb. 2008; retrieved from http://userwww.sfsu.edu/saltzman/Publist.html (9 pages).

Written Opinion of the International Searching Authority issued in connection with PCT/US2009/054352 dated Mar. 12, 2010, (5 pages).

Written Opinion of the International Searching Authority issued in connection with PCT/US2008/077042 dated Mar. 13, 2009, (6 pages).

Written Opinion of the International Searching Authority issued in connection with PCT/US2009/031611 dated Jun. 3, 2009, (7 pages).

Written Opinion of the International Searching Authority issued in connection with PCT/US2009/061537 dated Jun. 7, 2010, (10 pages).

Written Opinion of the International Searching Authority issued in connection with PCT/US2009/066254 dated Feb. 24, 2010, (5 pages).

Written Opinion of the International Searching Authority issued in connection with PCT/US2013/033261 dated Jun. 14, 2013, (7 pages).

Written Opinion of the International Searching Authority issued in connection with PCT/US2013/033265 dated Jul. 9, 2013, (7 pages).

(56) References Cited

OTHER PUBLICATIONS

Written Opinion of the International Searching Authority issued in connection with PCT/US2013/033268 dated May 31, 2013, (7 pages).

* cited by examiner

TECHNIQUES FOR BEHAVIORAL PAIRING IN A TASK ASSIGNMENT SYSTEM WITH AN EXTERNAL PAIRING SYSTEM

CROSS-REFERENCE TO RELATED APPLICATIONS

This patent application claims priority to U.S. Provisional Patent Application No. 62/970,526, filed Feb. 5, 2020, which is hereby incorporated by reference herein in its entirety.

FIELD OF THE DISCLOSURE

The present disclosure generally relates to task assignment systems and, more particularly, to techniques for behavioral pairing in a task assignment system with an external pairing system.

BACKGROUND OF THE DISCLOSURE

A typical pairing system algorithmically assigns tasks arriving at a task assignment system to agents available to handle those tasks. At times, the task assignment system may be in an "L1 state" and have agents available and waiting for assignment to tasks. At other times, the task assignment system may be in an "L2 state" and have tasks waiting in one or more queues for an agent to become available for assignment. At yet other times, the task assignment system may be in an "L3" state and have multiple agents available and multiple tasks waiting for assignment.

Some traditional pairing systems assign tasks to agents ordered based on time of arrival, and agents receive tasks ordered based on the time when those agents became available. This strategy may be referred to as a "first-in, first-out," "FIFO," or "round-robin" strategy. For example, in an L2 environment, when an agent becomes available, the task at the head of the queue would be selected for assignment to the agent.

Other traditional pairing systems may implement a performance-based routing (PBR) strategy for prioritizing higher-performing agents for task assignment. Under PBR, for example, the highest-performing agent among available agents receives the next available task.

"Behavioral Pairing" or "BP" strategies, for assigning tasks to agents, improve upon traditional pairing methods. BP targets balanced utilization of agents while simultaneously improving overall task assignment system performance potentially beyond what FIFO or PBR methods will achieve in practice.

When a pairing system is integrated into a task assignment system and is capable of switching between pairing strategies (e.g., FIFO, PBR, BP, etc.), benchmarking the relative performance of the task assignment system under each pairing strategy may be straightforward given that all the states (e.g., information and events about tasks and agents, pairing strategy used for every task-agent pairing, outcome of every pairing, etc.) of the task assignment system may be readily available to or otherwise retrievable by the pairing system. However, if a pairing system is external to a task assignment system, all the states of task assignment system may not be available to the pairing system for a comprehensive benchmarking. Thus, it may be understood that there may be a need for techniques for behavioral pairing in a task assignment system with an external pairing system.

SUMMARY OF THE DISCLOSURE

Techniques for behavioral pairing in a task assignment system with an external pairing system are disclosed. In one particular embodiment, the techniques may be realized as a method for behavioral pairing in a task assignment system with an external pairing system, the method comprising transmitting, by at least one computer processor communicatively coupled to and configured to operate in the task assignment system, to the external pairing system over an application programming interface, a control flag and a benchmark flag. The control flag may indicate whether a task-agent pairing in the task assignment system is to be based on a response by the external pairing system to a routing request sent by the at least computer processor. The benchmark flag may indicate whether the pairing of the task to the agent is to be based on one of a first pairing strategy and a second pairing strategy. The method may further comprise receiving, by the at least one computer processor, from the external pairing system, the task-agent pairing based on one of the first pairing strategy and the second pairing strategy, the task-agent pairing being based at least in part on the control flag and the benchmark flag.

In accordance with other aspects of this particular embodiment, the task assignment system is a contact center system.

In accordance with other aspects of this particular embodiment, the first pairing strategy is a behavioral pairing strategy, and wherein the second pairing strategy is one of a first-in, first-out strategy and a performance-based routing strategy.

In accordance with other aspects of this particular embodiment, the transmitting may further include transmitting events related to at least one of the task and the agent, and wherein the task-agent pairing may further be based on the events.

In accordance with other aspects of this particular embodiment, the first pairing strategy may be provided by the external pairing system, and the second pairing strategy may be provided by one of the external pairing system and the internal pairing system.

In another particular embodiment, the techniques may be realized as a system for behavioral pairing in a task assignment system with an external pairing system comprising at least one computer processor communicatively coupled to and configured to operate in the task assignment system, wherein the at least one computer processor is further configured to perform the steps in the above-described method.

In another particular embodiment, the techniques may be realized as an article of manufacture for behavioral pairing in a task assignment system with an external pairing system comprising a non-transitory processor readable medium and instructions stored on the medium, wherein the instructions are configured to be readable from the medium by at least one computer processor communicatively coupled to and configured to operate in the task assignment system and thereby cause the at least one computer processor to operate so as to perform the steps in the above-described method.

In another particular embodiment, the techniques may be realized as a method for behavioral pairing in an external pairing system communicatively coupled to a task assignment system, the method comprising receiving, by at least one computer processor communicatively coupled to and configured to operate in the external pairing system, from the task assignment system over an application programming interface, a control flag and a benchmark flag. The control flag may indicate whether a task-agent pairing in the task assignment system is to be based on a response by the external pairing system to a routing request received by the at least one computer processor. The benchmark flag may indicate whether the pairing of the task to the agent is to be based on one of a first pairing strategy and a second pairing strategy. The method may further comprise transmitting, by the at least one computer processor, to the task assignment system, the task-agent pairing of the first pairing strategy and the second pairing strategy, the task-agent pairing being based at least in part on the control flag and the benchmark flag.

In accordance with other aspects of this particular embodiment, the task assignment system is a contact center system.

In accordance with other aspects of this particular embodiment, the first pairing strategy is a behavioral pairing strategy, and wherein the second pairing strategy is one of a first-in, first-out strategy and a performance-based routing strategy.

In accordance with other aspects of this particular embodiment, the receiving may further include events related to at least one of the task and the agent, and wherein the task-agent pairing may further be based on the events.

In accordance with other aspects of this particular embodiment, the first pairing strategy may be provided by the external pairing system, and the second pairing strategy may be provided by one of the external pairing system and the internal pairing system.

In another particular embodiment, the techniques may be realized as a system for behavioral pairing in an external pairing system communicatively coupled to a task assignment system comprising at least one computer processor communicatively coupled to and configured to operate in the external pairing system, wherein the at least one computer processor is further configured to perform the steps in the above-described method for behavioral pairing in an external pairing system communicatively coupled to a task assignment system.

In another particular embodiment, the techniques may be realized as an article of manufacture for behavioral pairing in an external pairing system communicatively coupled to a task assignment system comprising a non-transitory processor readable medium and instructions stored on the medium, wherein the instructions are configured to be readable from the medium by at least one computer processor communicatively coupled to and configured to operate in the external pairing system and thereby cause the at least one computer processor to operate so as to perform the steps in the above-described method for behavioral pairing in an external pairing system communicatively coupled to a task assignment system.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
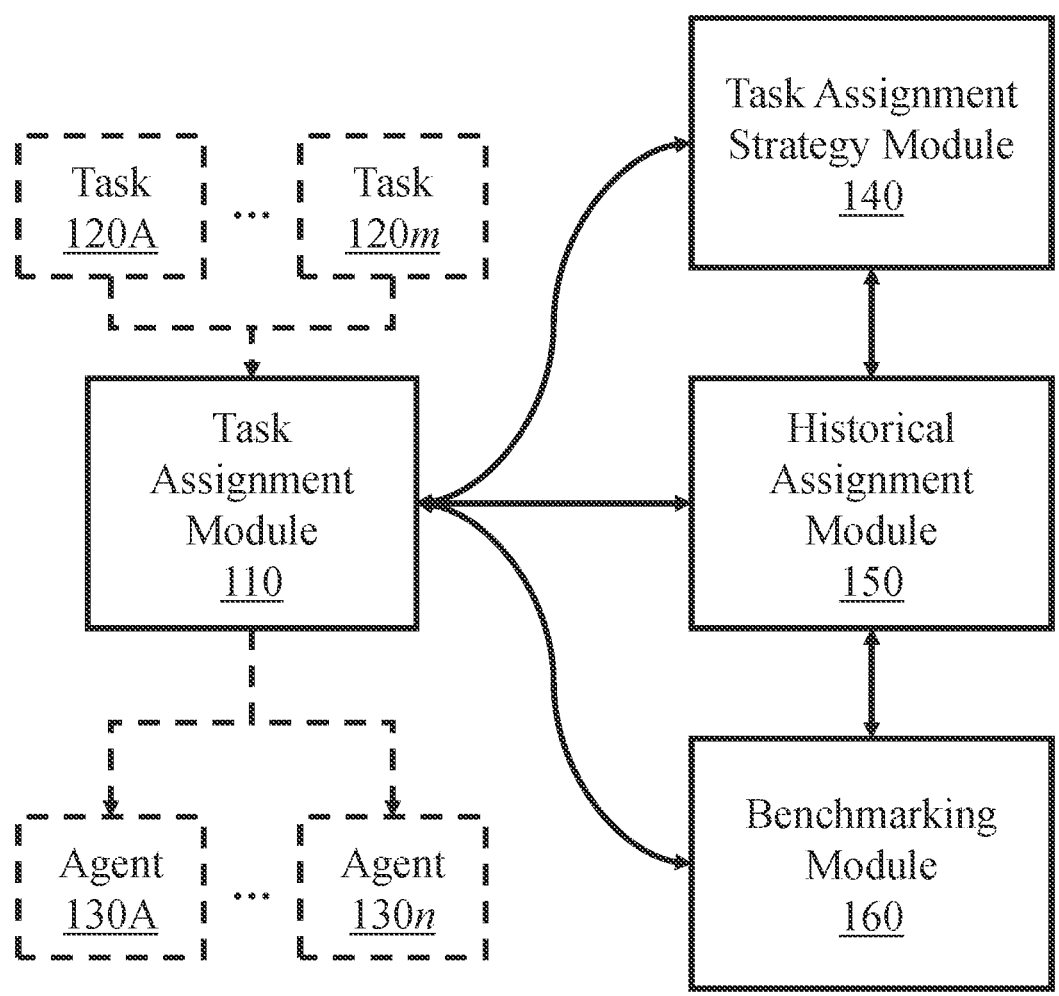
FIG. 1 shows a block diagram of a pairing system according to embodiments of the present disclosure.

A typical pairing system algorithmically assigns tasks arriving at a task assignment system to agents available to handle those tasks. At times, the task assignment system may be in an "L1 state" and have agents available and waiting for assignment to tasks. At other times, the task assignment system may be in an "L2 state" and have tasks waiting in one or more queues for an agent to become available for assignment. At yet other times, the task assignment system may be in an "L3" state and have multiple agents available and multiple tasks waiting for assignment. An example of a task assignment system is a contact center system that receives contacts (e.g., telephone calls, internet chat sessions, emails, etc.) to be assigned to agents.

Some traditional pairing systems assign tasks to agents ordered based on time of arrival, and agents receive tasks ordered based on the time when those agents became available. This strategy may be referred to as a "first-in, first-out," "FIFO," or "round-robin" strategy. For example, in an L2 environment, when an agent becomes available, the task at the head of the queue would be selected for assignment to the agent.

Other traditional pairing systems may implement a performance-based routing (PBR) strategy for prioritizing higher-performing agents for task assignment. Under PBR, for example, the highest-performing agent among available agents receives the next available task.

"Behavioral Pairing" or "BP" strategies, for assigning tasks to agents that improve upon traditional pairing methods. BP targets balanced utilization of agents while simultaneously improving overall task assignment system performance potentially beyond what FIFO or PBR methods will achieve in practice. This is a remarkable achievement inasmuch as BP acts on the same tasks and same agents as FIFO or PBR methods, approximately balancing the utilization of agents as FIFO provides, while improving overall task assignment system performance beyond what either FIFO or PBR provides in practice. BP improves performance by assigning agent and task pairs in a fashion that takes into consideration the assignment of potential subsequent agent and task pairs such that, when the benefits of all assignments are aggregated, they may exceed those of FIFO and PBR strategies.

Various BP strategies may be used, such as a diagonal model BP strategy or a network flow BP strategy. These task assignment strategies and others are described in detail for a contact center context in, e.g., U.S. Pat. Nos. 9,300,802, 9,781,269, 9,787,841, and 9,930,180, all of which are hereby incorporated by reference herein. BP strategies may be applied in an L1 environment (agent surplus, one task; select among multiple available/idle agents), an L2 environment (task surplus, one available/idle agent; select among multiple tasks in queue), and an L3 environment (multiple agents and multiple tasks; select among pairing permutations).

When a pairing system is integrated into a task assignment system and is capable of switching between pairing strategies, benchmarking the performance of the task assignment system under each pairing strategy may be straightforward given that all the states of the task assignment system (e.g., information and events about tasks and agents, pairing strategy used for every task-agent pairing, outcome of every pairing, etc.) may be readily available to or otherwise retrievable by the pairing system. As explained in detail below, embodiments of the present disclosure relate to techniques for behavioral pairing in a task assignment system with an external pairing system, where all the states of task assignment system may not be available to the pairing system for a comprehensive benchmarking.

The description herein describes network elements, computers, and/or components of a system and method for pairing strategies in a task assignment system that may include one or more modules. As used herein, the term "module" may be understood to refer to computing software, firmware, hardware, and/or various combinations thereof. Modules, however, are not to be interpreted as software which is not implemented on hardware, firmware, or recorded on a non-transitory processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

FIG. 1 shows a block diagram of a pairing system 100 according to embodiments of the present disclosure. The pairing system 100 may be included in a task assignment system (e.g., contact center system) or incorporated in a component or module (e.g., a pairing module) of a task assignment system for helping to assign tasks (e.g., contacts) among various agents.

The pairing system 100 may include a task assignment module 110 that is configured to pair (e.g., match, assign) incoming tasks to available agents. In the example of FIG. 1, m tasks 120A-120*m* are received over a given period, and n agents 130A-130*n* are available during the given period. Each of the m tasks may be assigned to one of the n agents for servicing or other types of task processing. In the example of FIG. 1, m and n may be arbitrarily large finite integers greater than or equal to one. In a real-world task assignment system, such as a contact center system, there may be dozens, hundreds, etc. of agents logged into the contact center system to interact with contacts during a shift, and the contact center system may receive dozens, hundreds, thousands, etc. of contacts (e.g., telephone calls, internet chat sessions, emails, etc.) during the shift.

In some embodiments, a task assignment strategy module 140 may be communicatively coupled to and/or configured to operate in the pairing system 100. The task assignment strategy module 140 may implement one or more task assignment strategies (or "pairing strategies") for assigning individual tasks to individual agents (e.g., pairing contacts with contact center agents). A variety of different task assignment strategies may be devised and implemented by the task assignment strategy module 140. In some embodiments, a FIFO strategy may be implemented in which, for example, the longest-waiting agent receives the next available task (in L1 environments) or the longest-waiting task is assigned to the next available agent (in L2 environments). In other embodiments, a PBR strategy for prioritizing higher-performing agents for task assignment may be implemented. Under PBR, for example, the highest-performing agent among available agents receives the next available task. In yet other embodiments, a BP strategy may be used for optimally assigning tasks to agents using information about either tasks or agents, or both. Various BP strategies may be used, such as a diagonal model BP strategy or a network flow BP strategy. See U.S. Pat. Nos. 9,300,802; 9,781,269; 9,787,841; and 9,930,180.

In some embodiments, a historical assignment module 150 may be communicatively coupled to and/or configured to operate in the pairing system 100 via other modules such as the task assignment module 110 and/or the task assignment strategy module 140. The historical assignment module 150 may be responsible for various functions such as monitoring, storing, retrieving, and/or outputting information about task-agent assignments that have already been made. For example, the historical assignment module 150 may monitor the task assignment module 110 to collect information about task assignments in a given period. Each record of a historical task assignment may include information such as an agent identifier, a task or task type identifier, offer or offer set identifier, outcome information, or a pairing strategy identifier (i.e., an identifier indicating whether a task assignment was made using a BP strategy, or some other pairing strategy such as a FIFO or PBR pairing strategy).

In some embodiments and for some contexts, additional information may be stored. For example, in a call center context, the historical assignment module 150 may also store information about the time a call started, the time a call ended, the phone number dialed, and the caller's phone number. For another example, in a dispatch center (e.g., "truck roll") context, the historical assignment module 150 may also store information about the time a driver (i.e., field agent) departs from the dispatch center, the route recommended, the route taken, the estimated travel time, the actual travel time, the amount of time spent at the customer site handling the customer's task, etc.

In some embodiments, the historical assignment module 150 may generate a pairing model or a similar computer processor-generated model based on a set of historical assignments for a period of time (e.g., the past week, the past month, the past year, etc.), which may be used by the task assignment strategy module 140 to make task assignment recommendations or instructions to the task assignment module 110.

In some embodiments, a benchmarking module 160 may be communicatively coupled to and/or configured to operate in the pairing system 100 via other modules such as the task assignment module 110 and/or the historical assignment module 150. The benchmarking module 160 may benchmark the relative performance of two or more pairing strategies (e.g., FIFO, PBR, BP, etc.) using historical assignment information, which may be received from, for example, the historical assignment module 150. In some embodiments, the benchmarking module 160 may perform other functions, such as establishing a benchmarking schedule for cycling among various pairing strategies, tracking cohorts (e.g., base and measurement groups of historical assignments), etc. Benchmarking is described in detail for the contact center context in, e.g., U.S. Pat. No. 9,712,676, which is hereby incorporated by reference herein.

In some embodiments, the benchmarking module 160 may output or otherwise report or use the relative performance measurements. The relative performance measurements may be used to assess the quality of a pairing strategy to determine, for example, whether a different pairing strategy (or a different pairing model) should be used, or to measure the overall performance (or performance gain) that was achieved within the task assignment system while it was optimized or otherwise configured to use one pairing strategy instead of another.

Figure 2:
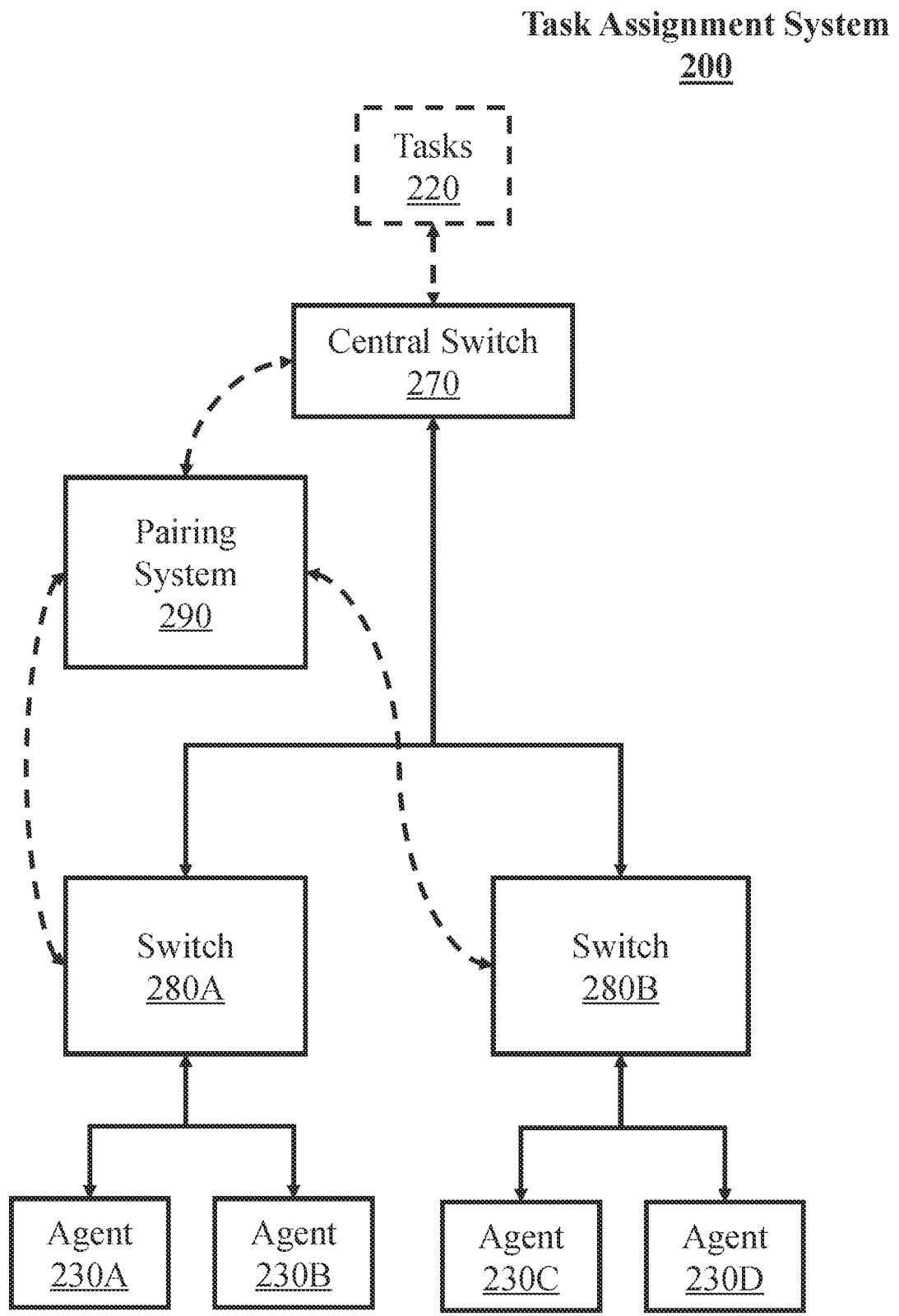
FIG. 2 shows a block diagram of a task assignment system according to embodiments of the present disclosure.

FIG. 2 shows a block diagram of a task assignment system 200 according to embodiments of the present disclosure. The task assignment system 200 may include a central switch 270. The central switch 270 may receive incoming tasks 220 (e.g., telephone calls, internet chat sessions, emails, etc.) or support outbound connections to contacts via a dialer, a telecommunications network, or other modules (not shown). The central switch 270 may include routing hardware and software for helping to route tasks among one or more queues (or subcenters), or to one or more Private Branch Exchange ("PBX") or Automatic Call Distribution (ACD) routing components or other queuing or switching components within the task assignment system 200. The central switch 270 may not be necessary if there is only one queue (or subcenter), or if there is only one PBX or ACD routing component in the task assignment system 200.

If more than one queue (or subcenter) is part of the task assignment system 200, each queue may include at least one switch (e.g., switches 280A and 280B). The switches 280A and 280B may be communicatively coupled to the central switch 270. Each switch for each queue may be communicatively coupled to a plurality (or "pool") of agents. Each switch may support a certain number of agents (or "seats") to be logged in at one time. At any given time, a logged-in agent may be available and waiting to be connected to a task, or the logged-in agent may be unavailable for any of a number of reasons, such as being connected to another task, performing certain post-call functions such as logging information about the call, or taking a break. In the example of FIG. 2, the central switch 270 routes tasks to one of two queues via switch 280A and switch 280B, respectively. Each of the switches 280A and 280B are shown with two agents each. Agents 230A and 230B may be logged into switch 280A, and agents 230C and 230D may be logged into switch 280B.

The task assignment system 200 may also be communicatively coupled to an integrated pairing system 290. The pairing system 290 may be native to (or built in) the task assignment system 200 (i.e., "first-party") or may be a service provided by, for example, a third-party vendor. In the example of FIG. 2, the pairing system 290 may be communicatively coupled to one or more switches in the switch system of the task assignment system 200, such as central switch 270, switch 280A, and switch 280B. In some embodiments, switches of the task assignment system 200 may be communicatively coupled to multiple pairing systems. In some embodiments, the pairing system 290 may be embedded within a component of the task assignment system 200 (e.g., embedded in or otherwise integrated with a switch). An example of the pairing system 290 is the pairing system 100, which is described above.

The pairing system 290 may receive information from a switch (e.g., switch 280A) about agents logged into the switch (e.g., agents 230A and 230B) and about incoming tasks 220 via another switch (e.g., central switch 270) or, in some embodiments, from a network (e.g., the Internet or a telecommunications network) (not shown). The pairing system 290 may process this information to determine which tasks should be paired (e.g., matched, assigned, distributed, routed) with which agents.

For example, in an L1 state, multiple agents may be available and waiting for connection to a task, and a task arrives at the task assignment system 200 via a network or the central switch 270. As explained above, without the pairing system 290, a switch will typically automatically distribute the new task to whichever available agent has been waiting the longest amount of time for an agent under a FIFO strategy, or whichever available agent has been determined to be the highest-performing agent under a PBR strategy. With the pairing system 290, contacts and agents may be given scores (e.g., percentiles or percentile ranges/bandwidths) according to a pairing model or other artificial intelligence data model, so that a task may be matched, paired, or otherwise connected to a preferred agent.

In an L2 state, multiple tasks are available and waiting for connection to an agent, and an agent becomes available. These tasks may be queued in a switch such as a PBX or ACD device. Without the pairing system 290, a switch will typically connect the newly available agent to whichever task has been waiting on hold in the queue for the longest amount of time as in a FIFO strategy or a PBR strategy when agent choice is not available. In some task assignment centers, priority queuing may also be incorporated, as previously explained. With the pairing system 290 in this L2 scenario, as in the L1 state described above, tasks and agents may be given percentiles (or percentile ranges/bandwidths, etc.) according to, for example, a model, such as an artificial intelligence model, so that an agent becoming available may be matched, paired, or otherwise connected to a preferred task.

In the task assignment system 200, the pairing system 290 may switch between pairing strategies and benchmark the relative performance of the task assignment system under each pairing strategy (e.g., by using a benchmarking module such as benchmarking module 160 of pairing system 100). The benchmarking results may help to determine which pairing strategy or combination of pairing strategies to use to optimize the overall performance of the task assignment system 200. Given that the pairing system 290 is integrated with—or "internal" to—the task assignment system 200, states of the task assignment system 200 (e.g., information and events about tasks and agents, pairing strategy used for every assignment, etc.) may be readily available to or otherwise retrievable by the pairing system 290 to conduct benchmarking calculations. However, in a task assignment system with an external pairing system, benchmarking may not be as straightforward, as will be described next.

Figure 3:
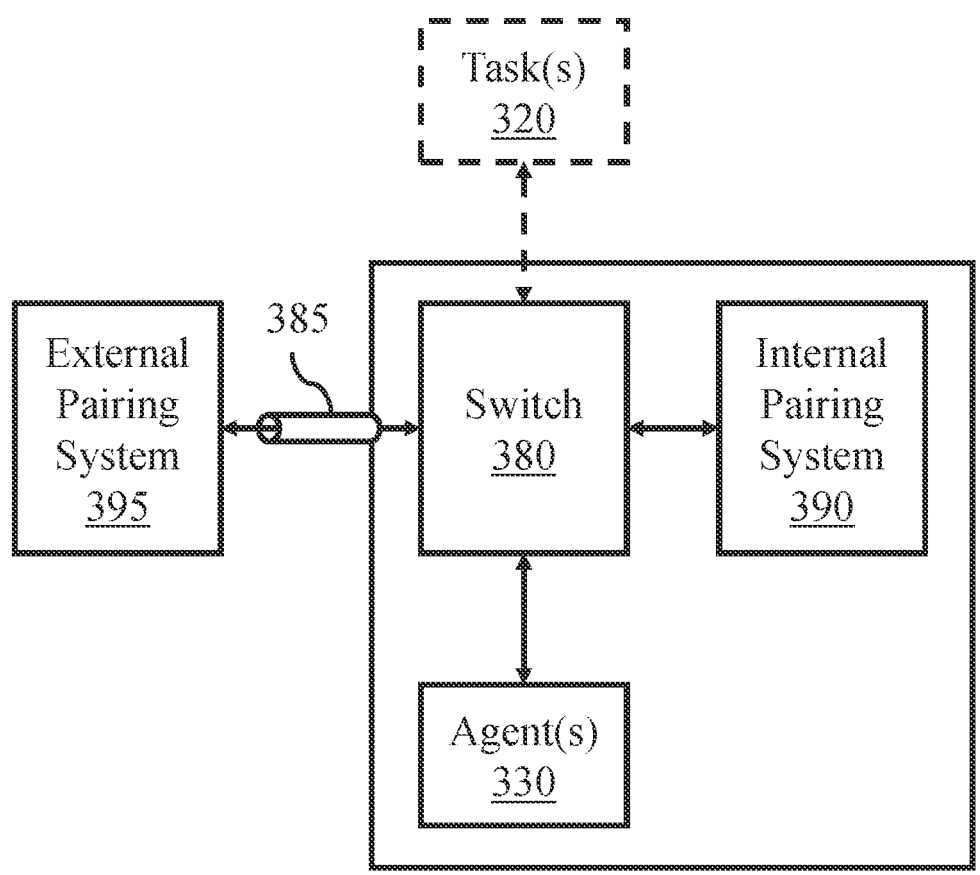
FIG. 3 shows a block diagram of a task assignment system with an external pairing system according to embodiments of the present disclosure.

FIG. 3 shows a block diagram of a task assignment system 300 with an external pairing system 395 according to embodiments of the present disclosure. In the task assignment system 300, a switch 380 may route a plurality of tasks 320 to a plurality of agents 330. The switch 380 may include routing hardware and software, or to one or more PBX or ACD routing components or other queuing or switching components for helping to route the plurality of tasks 320 among the plurality of agents 330.

In the task assignment system 300, an internal pairing system 390 may be communicatively coupled to the switch 380. The internal pairing system 390 may be native to (or built in) the task assignment system 300 (i.e., "first-party") or may be provided by a third-party vendor. Typically, the internal pairing system 390 may implement traditional pairing strategies (e.g., FIFO or PBR) or some other pairing strategy that may be proprietary to the task assignment system 300. However, the internal pairing system 390 may also be in the form of the pairing system 100. The internal pairing system 390 may receive or otherwise retrieve information from the switch 380 about the agents 330 logged into the switch 380 and about the incoming tasks 320.

In the task assignment system 300, the external pairing system 395 may be communicatively coupled to the switch 380 via an interface 385. The interface 385 may isolate the task assignment system 300 from the external pairing system 395 (e.g., for security purposes), and control information exchanged between the two systems. An example of the interface 385 may be a public or a private proprietary application programming interface (API) provided over a network (e.g., the Internet or a telecommunications network) (not shown).

Unlike the internal pairing system 390, the external pairing system 395 may only have access to information that is selected and shared by the switch 380. Such information must be sufficient for the external pairing system 395 to determine optimal task-agent pairings. The external pairing system 395 may be provided by a third-party vendor and may be in the form of the pairing system 100 described above. Importantly, the external pairing system 395 may provide a pairing strategy (e.g., BP) that improves the performance of the task assignment system 300 when compared to the pairing strategy (or strategies) of the internal pairing system 390. The external pairing system 395 may also provide the same or a similar pairing strategy as that of the internal pairing system 390.

The task assignment system 300 may operate under a shared control, in which the switch 380 may send some route requests to the internal pairing system 390 and other route requests to the external pairing system 395, depending on which pairing system should control the pairing and determine which task is to be routed to which agent. The shared control may be desirable, for example, when the internal pairing system 390 employs a traditional or proprietary pairing strategy (e.g., FIFO or PBR) that may not be provided by the external pairing system 395, while the external pairing system 395 is used to provide a higher-performing pairing strategy (e.g., BP).

When the external pairing system 395 includes the same or a similar pairing strategy as that of the internal pairing system 390 (or it can emulate or otherwise simulate the pairing strategy of the internal pairing system 390), the task assignment system 300 may, in some embodiments, operate under full control such that the switch 380 sends all route requests to the external pairing system 395. In other words, the external pairing system 395 has full control on determining every task-agent pairing. Under the full control, at times, the external pairing system 395 may simulate/mimic the pairing strategy of the internal pairing system 390 (e.g., FIFO or PBR) and, at other times, employ a different pairing strategy (e.g., BP), and send its pairing recommendation to the switch 380 over the interface 385. The switch 380 may then assign the tasks 320 to agents 330 based on the pairing recommendation.

In some embodiments, shared control and full control may be a preconfigured setting in the task assignment system 300. In other embodiments, the task assignment system 300 may switch between shared control and full control automatically during runtime or by receiving input from a task assignment system manager or operator. The task assignment system 300 may use a control flag to indicate whether a historical task was assigned by the internal pairing system 390 or the external pairing system 395. The task assignment system 300 may share the control flag with the external pairing system 395 (e.g., for benchmarking purposes) over the interface 385.

Under either shared control or full control, the task assignment system 300 may use a second flag—a benchmark flag—to indicate whether a historical task was an "ON" task or an "OFF" task. An ON task is a task assigned by the external pairing module 395 using a higher-performing pairing strategy (e.g., BP). An OFF task is a task assigned using a traditional pairing strategy (e.g., FIFO or PBR) by either the internal pairing module 390 or the external pairing module 395. When operating in shared control, the task assignment system 300 (or the switch 380) may determine which of the tasks 320 should be ON or OFF. In full control, the task assignment 300 may either (1) mark tasks as ON or OFF prior to sending route requests to the external pairing system 395, or (2) send the route requests to the external pairing system 395 and allow the external pairing system 395 to determine which of the task should be treated as ON or OFF. The determination of the whether a task should be ON or OFF may be based on one or more predetermined schemes or an agreement between the task assignment system 300 and the external pairing system 395. See U.S. Pat. No. 9,712,676.

In some embodiments, the benchmark flag may also be used to indicate that a historical task was paired to an agent by the internal pairing system 390 when the task should have been paired by the external pairing system 395 (i.e., ON tasks under shared control, or both ON and OFF tasks under full control). In these situations, the benchmark flag may be set to a third value, e.g., "Default" instead of "ON" or "OFF"). Historical task assignments flagged as "Default" may be excluded from benchmarking calculations in some embodiments given that such assignments may have been due to unintentional errors or failures in the task assignment system 300.

In some embodiments, it may be desirable for the external pairing system 395 to observe the task assignment system 300 and gather data to build or refine a pairing strategy or pairing model while the internal pairing system 390 assigns tasks 320 to agents 330. Historical tasks assigned in such a fashion may be indicated by setting the benchmark flag to a fourth value, e.g., "Monitor Mode." Unlike a "Default" benchmark flag that may arise due to an unintentional error or failure in the task assignment system 300, a "Monitor Mode" benchmark flag may be intentional and, therefore, the corresponding historical task may or may not need to be excluded from benchmarking calculations, depending on the configuration of the task assignment system 300. Like the control flag, the task assignment system 300 may share the benchmark flag with the external pairing system 395 (e.g., for benchmarking purposes) over the interface 385.

In task assignment system 300, either the internal pairing system 390 or the external pairing system 395 may benchmark the relative performance of the task assignment system 300 under a traditional pairing strategy (e.g., FIFO or PBR) and a higher-performing pairing strategy (e.g., BP). Since the internal pairing system 390 is integral to the task assignment system 300, states of the task assignment system 300 (e.g., information and events about tasks 320 and agents 330, pairing strategy used for every task-agent pairing, outcome of every pairing, etc.) may be readily available for benchmarking calculations. However, the external pairing system 395 must rely on information provided by the task assignment system 300 over the interface 385 to perform pairing.

In some embodiments, the external pairing system operates in a "stateless" environment, where the task assignment system 300 may provide enough information within each route request for the external pairing system 395 to make a pairing recommendation. For example, in addition to the control flag (indicating shared control or full control) and the benchmark flag (indicating ON tasks, OFF tasks, Default, or Monitor Mode), the task assignment system 300 may provide the external pairing system 395 with an adequate amount of state information within the route request (e.g., the complete set of agents available for pairing and the complete set of tasks available for pairing). In some embodiments, the stateless route request may include additional information, such as an ordered set of agents ordered by idle time and/or an ordered set of tasks ordered by waiting time.

In other embodiment, the external pairing system 395 may be in a "stateful" environment, where the task assignment system 300 provides event information over the interface 385 such that the external pairing system 395 may maintain a mirror image of the state of the task assignment system 300. In other words, every relevant event that takes place in task assignment system 300 is shared with the external pairing system 395, such as such as time of arrival of every task, when an agent becomes available, when an agent logs out, when a call hangs up (in the context of a call center), etc. The interface 385 may support error-checking or reset functionality to help the external pairing system 395 maintain fidelity in the mirrored state with the task assignment system 300.

The task assignment system 300 is illustrated as having a single queue with the single switch 380 for simplicity. The task assignment system 300 could include additional queues with corresponding switches, in which case, either each switch could be communicatively coupled to the internal pairing system 390 and the external pairing system 395, or there could be an internal pairing system and an external pairing system for each switch.

Figure 4:
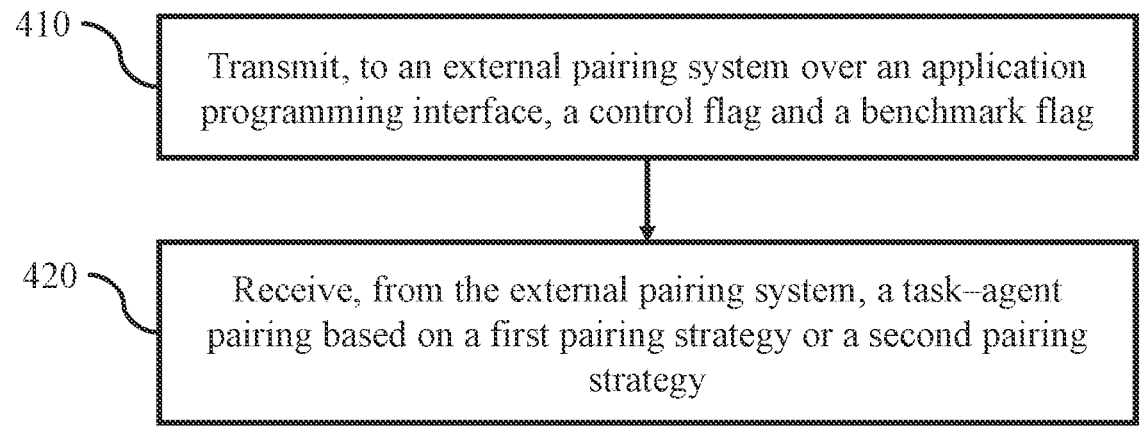
FIG. 4 shows a flow diagram of a benchmarking method for a task assignment system with an external pairing system according to embodiments of the present disclosure.

FIG. 4 shows a flow diagram of a benchmarking method 400 for a task assignment system (e.g., task assignment system 300) with an external pairing system (e.g., external pairing system 395) according to embodiments of the present disclosure.

The benchmarking method 400 may begin at block 410. At block 410, the benchmarking method 400 may transmit, to the external pairing system over an API, a control flag and a benchmark flag. As described above, the control flag may indicate whether a pairing of a task to an agent in the task assignment system was based on a response by the external pairing system to a routing request sent by the task assignment system or a routing switch (e.g., switch 380) within the task assignment system.

At block 420, the benchmarking method 400 may receive, from the external pairing system, a task-agent pairing based on a first pairing strategy or a second pairing strategy. The task-agent pairing may be based at least in part on the control flag and the benchmark flag. The first pairing strategy may be a BP strategy and may be provided by the external pairing system. The second pairing strategy may be a FIFO strategy or a PBR strategy and may be provided either by the external pairing system or an internal pairing system (e.g., internal pairing system 390) of the task assignment system.

Figure 5:
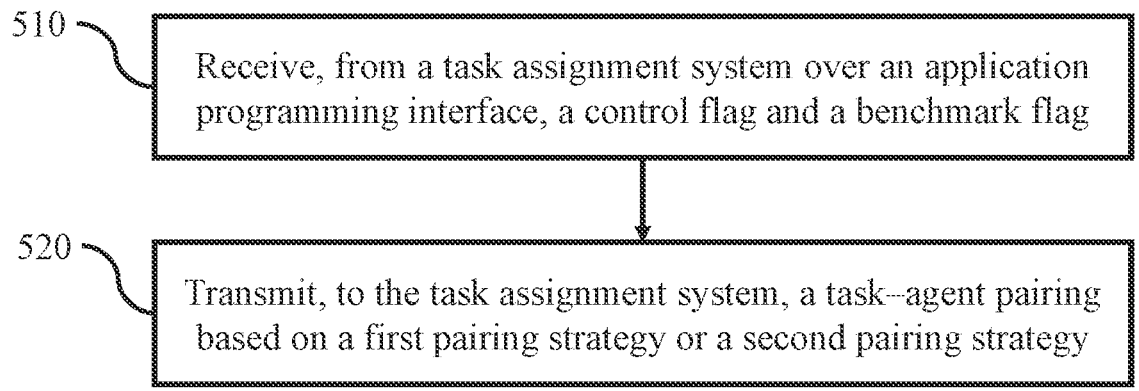
FIG. 5 shows a flow diagram of a benchmarking method for an external pairing system communicatively coupled to a task assignment system according to embodiments of the present disclosure.

FIG. 5 shows a flow diagram of a benchmarking method 500 for an external pairing system (e.g., external pairing system 395) communicatively coupled to a task assignment system (e.g., task assignment system 300) according to embodiments of the present disclosure.

The benchmarking method 500 may begin at block 510. At block 510, the benchmarking method 500 may receive, from the task assignment system over an API, a control flag and a benchmark flag. The control flag may indicate whether a pairing of a task to an agent in the task assignment system was based on a response by the external pairing system to a routing request received by the external pairing system.

At block 520, the benchmarking method 500 may transmit, to the task assignment system, a task-agent pairing based on a first pairing strategy or a second pairing strategy. The task-agent pairing may be based at least in part on the control flag and the benchmark flag. The first pairing strategy may be a BP strategy and may be provided by the external pairing system. The second pairing strategy may be a FIFO strategy or a PBR strategy and may be provided either by the external pairing system or an internal pairing system (e.g., internal pairing system 390) of the task assignment system.

At this point it should be noted that task assignment in accordance with the present disclosure as described above may involve the processing of input data and the generation of output data to some extent. This input data processing and output data generation may be implemented in hardware or software. For example, specific electronic components may be employed in a behavioral pairing module or similar or related circuitry for implementing the functions associated with task assignment in accordance with the present disclosure as described above. Alternatively, one or more processors operating in accordance with instructions may implement the functions associated with task assignment in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes.

The invention claimed is:

1. A method for behavioral pairing in a task assignment system with an external pairing system, the method comprising:
    transmitting, by at least one computer processor communicatively coupled to and configured to operate in the task assignment system, to the external pairing system over an application programming interface, a control flag and a benchmark flag, wherein:

the control flag indicates whether a task-agent pairing in the task assignment system is to be based on a response by the external pairing system to a routing request sent by the at least one computer processor; and the benchmark flag indicates whether the pairing of the task to the agent is to be based on one of a first pairing strategy and a second pairing strategy; and receiving, by the at least one computer processor, from the external pairing system, the task-agent pairing based on one of the first pairing strategy and the second pairing strategy, the task-agent pairing being based at least in part on the control flag and the benchmark flag, wherein the transmitting further includes transmitting events related to at least one of the task and the agent, and further wherein the task-agent pairing is further based on the events.

2. The method of claim 1, wherein the task assignment system is a contact center system.

3. The method of claim 1, wherein the first pairing strategy is a behavioral pairing strategy, and wherein the second pairing strategy is one of a first-in, first-out strategy and a performance-based routing strategy.

4. The method of claim 1, wherein the first pairing strategy is provided by the external pairing system, and the second pairing strategy is provided by one of the external pairing system and the internal pairing system.

5. A system for behavioral pairing in a task assignment system with an external pairing system comprising:

at least one computer processor communicatively coupled to and configured to operate in the task assignment system, wherein the at least one computer processor is further configured to:

transmit, to the external pairing system over an application programming interface, a control flag and a benchmark flag, wherein:

the control flag indicates whether a task-agent pairing in the task assignment system is to be based on a response by the external pairing system to a routing request sent by the at least one computer processor; and the benchmark flag indicates whether the pairing of the task to the agent is to be based on one of a first pairing strategy and a second pairing strategy; and receive, from the external pairing system, the task-agent pairing based on one of the first pairing strategy and the second pairing strategy, the task-agent pairing being based at least in part on the control flag and the benchmark flag, wherein the transmitting further includes transmitting events related to at least one of the task and the agent, and further wherein the task-agent pairing is further based on the events.

6. The system of claim 5, wherein the task assignment system is a contact center system.

7. The system of claim 5, wherein the first pairing strategy is a behavioral pairing strategy, and wherein the second pairing strategy is one of a first-in, first-out strategy and a performance-based routing strategy.

8. The system of claim 5, wherein the first pairing strategy is provided by the external pairing system, and the second pairing strategy is provided by one of the external pairing system and the internal pairing system.

9. An article of manufacture for behavioral pairing in a task assignment system with an external pairing system comprising:

a non-transitory processor readable medium; and
instructions stored on the medium;
wherein the instructions are configured to be readable from the medium by at least one computer processor communicatively coupled to and configured to operate in the task assignment system and thereby cause the at least one computer processor to operate so as to:

transmit, to the external pairing system over an application programming interface, a control flag and a benchmark flag, wherein:

the control flag indicates whether a task-agent pairing in the task assignment system is to be based on a response by the external pairing system to a routing request sent by the at least one computer processor; and the benchmark flag indicates whether the pairing of the task to the agent is to be based on one of a first pairing strategy and a second pairing strategy; and receive, from the external pairing system, the task-agent pairing based on one of the first pairing strategy and the second pairing strategy, the task-agent pairing being based at least in part on the control flag and the benchmark flag, wherein the transmitting further includes transmitting events related to at least one of the task and the agent, and further wherein the task-agent pairing is further based on the events.

10. The article of manufacture of claim 9, wherein the task assignment system is a contact center system.

11. The article of manufacture of claim 9, wherein the first pairing strategy is a behavioral pairing strategy, and wherein the second pairing strategy is one of a first-in, first-out strategy and a performance-based routing strategy.

12. The article of manufacture of claim 9, wherein the first pairing strategy is provided by the external pairing system, and the second pairing strategy is provided by one of the external pairing system and the internal pairing system.

13. A method for behavioral pairing in an external pairing system communicatively coupled to a task assignment system, the method comprising:

receiving, by at least one computer processor communicatively coupled to and configured to operate in the external pairing system, from the task assignment system over an application programming interface, a control flag and a benchmark flag, wherein:

the control flag indicates whether a task-agent pairing in the task assignment system is to be based on a response by the external pairing system to a routing request received by the at least one computer processor; and the benchmark flag indicates whether the pairing of the task to the agent is to be based on one of a first pairing strategy and a second pairing strategy; and transmitting, by the at least one computer processor, to the task assignment system, the task-agent pairing of the first pairing strategy and the second pairing strategy, the task-agent pairing being based at least in part on the control flag and the benchmark flag, wherein the receiving further includes events related to at least one of the task and the agent, and wherein the task-agent pairing is further based on the events.

14. The method of claim 13, wherein the task assignment system is a contact center system.

15. The method of claim 13, wherein the first pairing strategy is a behavioral pairing strategy, and wherein the second pairing strategy is one of a first-in, first-out strategy and a performance-based routing strategy.

16. The method of claim 13, wherein the first pairing strategy is provided by the external pairing system, and the second pairing strategy is provided by one of the external pairing system and the internal pairing system.

17. A system for benchmarking in an external pairing system communicatively coupled to a task assignment system comprising:
at least one computer processor communicatively coupled to and configured to operate in the external pairing system, wherein the at least one computer processor is further configured to:
receive, from the task assignment system over an application programming interface, a control flag and a benchmark flag, wherein:
the control flag indicates whether a task-agent pairing in the task assignment system is to be based on a response by the external pairing system to a routing request received by the at least one computer processor; and
the benchmark flag indicates whether the pairing of the task to the agent is to be based on one of a first pairing strategy and a second pairing strategy; and
transmit, to the task assignment system, the task-agent pairing of the first pairing strategy and the second pairing strategy, the task-agent pairing being based at least in part on the control flag and the benchmark flag, wherein the receiving further includes events related to at least one of the task and the agent, and wherein the task-agent pairing is further based on the events.

18. The system of claim 17, wherein the task assignment system is a contact center system.

19. The system of claim 17, wherein the first pairing strategy is a behavioral pairing strategy, and wherein the second pairing strategy is one of a first-in, first-out strategy and a performance-based routing strategy.

20. The system of claim 17, wherein the first pairing strategy is provided by the external pairing system, and the second pairing strategy is provided by one of the external pairing system and the internal pairing system.

21. An article of manufacture for benchmarking in an external pairing system communicatively coupled to a task assignment system comprising:
a non-transitory processor readable medium; and
instructions stored on the medium;
wherein the instructions are configured to be readable from the medium by at least one computer processor communicatively coupled to and configured to operate in the external pairing system and thereby cause the at least one computer processor to operate so as to:
receive, from the task assignment system over an application programming interface, a control flag and a benchmark flag, wherein:
the control flag indicates whether a task-agent pairing in the task assignment system is to be based on a response by the external pairing system to a routing request received by the at least one computer processor; and
the benchmark flag indicates whether the pairing of the task to the agent is to be based on one of a first pairing strategy and a second pairing strategy; and
transmit, to the task assignment system, the task-agent pairing of the first pairing strategy and the second pairing strategy, the task-agent pairing being based at least in part on the control flag and the benchmark flag, wherein the receiving further includes events related to at least one of the task and the agent, and wherein the task-agent pairing is further based on the events.

22. The article of manufacture of claim 21, wherein the task assignment system is a contact center system.

23. The article of manufacture of claim 21, wherein the first pairing strategy is a behavioral pairing strategy, and wherein the second pairing strategy is one of a first-in, first-out strategy and a performance-based routing strategy.

24. The article of manufacture of claim 21, wherein the first pairing strategy is provided by the external pairing system, and the second pairing strategy is provided by one of the external pairing system and the internal pairing system.

* * * * *